Oct. 4, 1932.   E. W. DAVIS   1,880,855
LUBRICATING APPARATUS
Filed Nov. 11, 1927
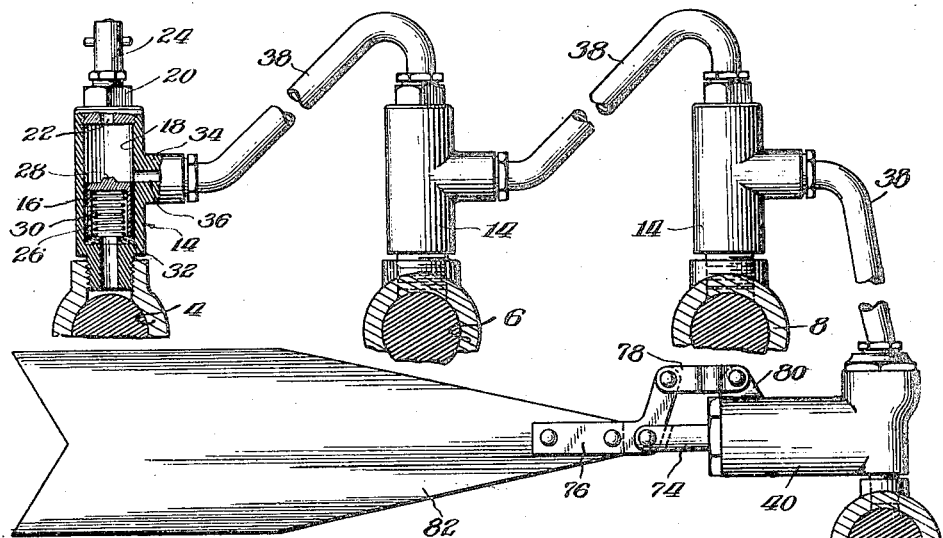
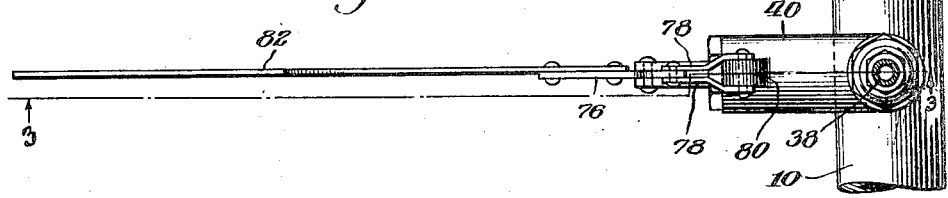
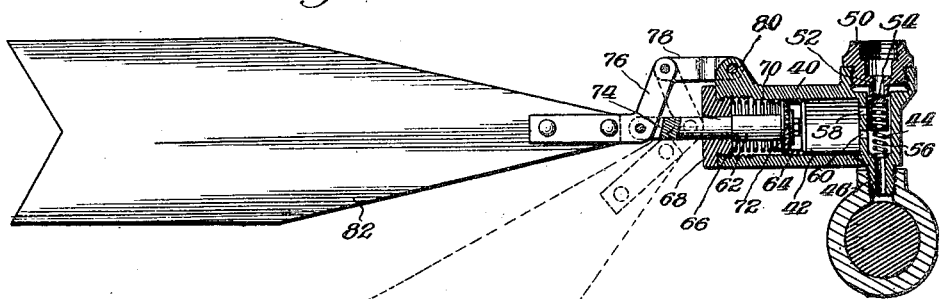
Inventor
Ernest W. Davis,
Williams, Bradbury,
McCoid & Kiser Attys.

Patented Oct. 4, 1932

1,880,855

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING APPARATUS

Application filed November 11, 1927. Serial No. 232,548.

My invention relates generally to lubricating apparatus and more particularly to improvements in central systems in which a plurality of bearings are adapted to be successively lubricated from a single source.

It is among the objects of my invention to provide a series or progressive system of lubrication, in which a device, attached to the last bearing of a series, is provided for indicating that the lubricating operation has been completed.

A further object is to provide an improved indicator which also functions as a measuring valve.

A further object is to provide an improved indcating device which may be manually operated to increase the lubricant pressure at the bearing to which the indicator is attached.

Other objects will appear from the following description, reference being had to the accompanying drawing, in which Fig. 1 shows several measuring valves and the indicator in elevation, and one of the measuring valves in broken vertical section;

Fig. 2 is a plan view of the indicating device;

Fig. 3 is a vertical sectional view of the indicating device taken on the line 3—3 of Fig. 2.

In Fig. 1 I have diagrammatically shown four bearings 4, 6, 8, and 10, which represent a group of bearings on a machine and are illustrative of practically any number of bearings which may be lubricated as a group, for example, all of the bearings of a long line shaft may be lubricated as a group and connected as shown in this figure. Attached to each of the bearings, 4, 6, and 8, is a measuring device 14 which comprises a generally cylindrical body 16 having an axially bored cylinder 18, the upper end of which is threaded to receive a cap 20 having an axial passage 22 which is in communication with the bore of a pin fitting 24, which is in turn threaded in the cap 20. The pin fitting 24 is of the well-known type which is adapted to receive lubricant under high pressure from any suitable compressor.

A piston valve 26 having a frusto-conical projection 28 at the center of its top surface is freely reciprocable within the cylinder 18, being normally urged upwardly, with its projection 28 closing the passage 22, by a spring 30, which is confined within the piston valve and has its lower end resting upon a perforated gasket 32. The body 16 has a laterally extending boss 34 having an outlet port 36 passing therethrough and communicating with a conduit 38 leading to the next measuring device 14. Any number of measuring devices 14 may thus be connected in series.

In operation these measuring valves are actuated successively or seriatim.

Assuming that the system is filled with lubricant and the piston valve 26 of the first measuring device 14 in its uppermost position, the operation will be as follows:

The compressor is attached to the fitting 24 and lubricant forced through the passage 22. Thus, when sufficient pressure is attained to overcome the force of spring 30, the piston valve will be moved from its uppermost position to the lowermost position, it will be noted that the pressure required to initiate movement of the piston valve 26 is very much greater than that required to continue the downward movement thereof, due to the fact that the cross-sectional area of the projection 28 is only a small portion of the piston area of the valve. As the valve moves downwardly it forces the lubricant in the chamber 18 below the valve out to the bearing 4, until the lower annular edge of the piston seats upon the gasket 32, whereupon further flow of lubricant to the bearing is prevented. As the valve approaches its lowermost position, it uncovers the port 36 leading to the next measuring device of the series. The full downward stroke of the piston valve is, however, assured because the pressure required initially to move the corresponding piston valve of the next device of the series is very much greater than that required to force the first piston valve 26 firmly against its gasket 32. Each of the devices of the series will successively operate in the same manner and upon release of pressure, due to the clearance between the valves 26 and their cylinders 18, the piston valves will be forced slowly upwardly by their springs 30, thus restoring the system to its normal condition.

The details of the measuring devices above described do not form a part of the present invention, except as a part of my improved system, but are disclosed and claimed in my copending application Serial No. 219,837, filed September 16, 1927, but a brief description thereof is deemed necessary to a complete understanding of my present invention, which relates to the means for indicating when the measuring devices of the whole system have been operated as above described.

The terminal indicator as shown in section in Fig. 3 comprises a body 40 having a horizontally bored cylinder 42 and a smaller vertically drilled cylinder 44. The body has a suitable threaded projection 46 by which the indicator is secured to the last bearing 10 of a series. A bushing 50, which is adapted to receive the end of a conduit 38, is threaded at the upper end of the cylinder 44 and has an annular portion 52 projecting downwardly into the cylinder 44 and forming a seat for a small piston valve 54 which is freely reciprocable within the cylinder 44, and is normally held against the seat 52 by a spring 56. The end wall of cylinder 42 has an inlet port 58 and an outlet port 60 forming communicating ducts between the cylinders 42 and 44. A stem 62, having a cup leather piston 64 suitably secured at its inner end, is shouldered at 66 to limit the outward movement thereof by abutment against a head 68 threaded in the outer end of the cylinder 42. The piston and its stem 62 are resiliently forced inwardly by a spring 70 which is compressed between the head 68 and a backing plate 72, which acts as a support for the cup leather piston 64. The stem portion 74 of reduced diameter extends outwardly and is diametrically slotted to receive a bell crank 76 which is pivoted thereto. A pair of links 78 are pivotally connected at the end of one of the arms of the bell crank 76, the other ends of the links being pivoted to a lug 80 formed integrally with the body 40. The outer arm of the bell crank 76 has a semaphore 82 riveted thereto.

The operation of the indicator is as follows:

After the last measuring device 14 of the series has operated and uncovered its outlet port 36, lubricant will pass through the conduit 38 to the indicating device 40, and force the piston valve 54 downwardly against the pressure of its spring 56 until this valve uncovers the inlet port 58. It will be noted that the valve closes the outlet port 60 prior to uncovering the inlet port 58. Normally the pressure will be sufficient to force the valve 54 to the lower end of the cylinder 44, whereupon its lower edge will seat at the end of the cylinder. The lubricant passing through the inlet port 58 will force the piston and stem 62 outwardly against the pressure of spring 70 and actuate the semaphore from the position shown in dotted lines in Fig. 3 to the position shown in full lines.

Assuming that the system is being used to lubricate a long series of bearings on a line shaft, the operator will continue forcing lubricant into the fitting 24 until he sees the semaphore 82 shift to the horizontal position, which will serve as an indication that he has forced sufficient lubricant into the system. He will then disconnect the compressor, and the devices will return to a normal position, as above described, and the valve 54 of the indicating devices will be forced upwardly by its spring 56 until it again abuts against its seat 52. As it approaches its uppermost position the valve 54 will uncover the outlet port 60 and permit the passage of lubricant from the cylinder 42 through the port 60 to the bearing to be lubricated. The spring 70 will, of course, expand to exert sufficient pressure normally to force the contents of the cylinder 42 into the bearing, but should the bearing be slightly clogged, or otherwise offer unusual resistance to the flow of lubricant, the semaphore 82 may be used as a lever to move the plunger inwardly and thereby act as a booster to augment the force of the spring 70 and force the lubricant to the bearing under increased pressure.

It will be noted that the indicating device 40 has a fixed lubricant capacity since the stroke of its plunger is limited and that in effect it is a combined indicating device and measuring device. In certain instances the indicator will not only serve as a means to apprise the operator that he has forced sufficient lubricant into the system, but also will indicate in its dropped position that the bearing to which the indicating device is attached is in need of additional lubrication, and that the system should again be supplied with lubricant. However, under usual circumstances, as for example, when the system is used to lubricate line shaft bearings, operation of the system once, or at the most twice, a day will be sufficient to keep the bearings well lubricated, and it has been found that the semaphore 82 will drop to its lower position within an hour or two after the release of pressure on the system when the device is attached to a normal bearing.

While I have shown and described a particular embodiment of my invention, I do not wish to be limited to the details disclosed, but desire the scope of my invention to be limited only by the claims which follow:

I claim:

1. A system of lubrication comprising a plurality of bearings to be lubricated, a lubricant charge measuring device associated with each of said bearings and adapted to deliver a measured charge to its bearing and thereafter uncover an outlet passage, conduits connecting the outlet passages of each of said devices to the inlet passage of the next adjacent device, and a terminal lubricant charge measuring device connected to the last of said devices, said terminal device comprising a valve chamber, a storage cylinder adjacent thereto, a plunger in said storage cylinder, an indicator adapted to be actuated by said plunger through the use of a bell crank lever, and a valve in said valve chamber for controlling the admission and discharge of lubricant from said storage cylinder.

2. A system of lubrication comprising a plurality of bearings to be lubricated, a lubricant measuring device associated with each of said bearings and adapted to deliver a measured charge to its bearing and thereafter uncover an outlet passage, conduits connecting the outlet passages of each of said devices to the inlet passage of the next adjacent device, and a terminal lubricant charge measuring device connected to the outlet of the last of said devices, said terminal device comprising a storage chamber, a valve cylinder, admission and discharge ports between said valve cylinder and storage chamber, valve means in said cylinder to control the admission to and discharge of lubricant from said storage chamber, means to connect said valve cylinder to a bearing to be lubricated, a piston reciprocable within said storage chamber, a spring coacting with said piston to force lubricant from said storage chamber, and a semaphore operably connected to said piston by means of a bell crank lever for either manually or by gravity discharging lubricant under pressure.

3. In a series system of lubrication, a plurality of bearings, a series of lubricant charge measuring device, each associated with one of said bearings, and adapted to deliver a measured charge to its bearing and thereafter uncover a passage to permit flow of lubricant to the next lubricant measuring device of the series, and a terminal lubricant measuring device at the end of said series, said terminal device being provided with means for delivering a measured charge to its bearing and having manually operable means for increasing the pressure on the lubricant discharged therefrom.

4. In a series or progressive system of lubrication, a plurality of bearings, a series of lubricant charge measuring devices, each associated with one of said bearings and adapted to deliver a measured charge to its bearing and thereafter allow lubricant to pass through it to the next succeeding device, conduits connecting said devices in series, and a terminal lubricant charge measuring device connected to the last device of the series, said terminal device being adapted to indicate the completion of the lubricating operation of the complete system and comprising a storage chamber adapted to be filled with lubricant after the preceding measuring devices of the series have operated, a plunger in said storage chamber, a stem secured to said plunger and extending from said chamber, and a semaphore signal attached to said stem and adapted to be moved, thereby to indicate the quantity of lubricant contained in said storage chamber.

5. A combination measuring valve and indicating device comprising a body having a relatively large storage cylinder, a valve cylinder extending transversely at the end of said storage cylinder, means for connecting a source of lubricant to said valve cylinder, said means including a valve seat, an inlet and an outlet port between said valve cylinder and said storage cylinder, means to connect said valve cylinder to a bearing to be lubricated, a spring pressed valve normally resting on said valve seat and cutting off communication between said valve cylinder and said supply conduit, said valve being adapted upon the pressure impulse to close said outlet port and open said inlet port, thereby to permit flow of lubricant from said supply conduit to said storage cylinder, and to return to normal position upon cessation of said lubricant pressure impulse, a piston reciprocable within said storage cylinder, a piston stem secured thereto and protruding from the end of said body, a spring tending to force lubricant from said storage chamber, a semaphore arm pivoted adjacent the outer end of said piston rod and adapted to be swung about a pivotal axis by reciprocation of said plunger.

6. A combination measuring valve and indicating device comprising a body having a storage cylinder, a valve cylinder extending transversely at the end of said storage cylinder, means for connecting a source of lubricant to said valve cylinder, said means including a valve seat, and an inlet and an outlet port between said valve cylinder and said storage cylinder, means to connect said valve cylinder to a bearing to be lubricated, a valve normally resting on said valve seat and cutting off communication between said valve cylinder and said supply conduit, said valve being adapted upon the pressure impulse to close said outlet port and open said inlet port, thereby to permit flow of lubricant from said supply conduit to said storage cylinder, and to return to normal position upon cessation of said lubricant pressure impulse, a resilient wall in said storage cylinder, connecting means secured thereto and protruding from the end of said body, and a semaphore signal attached by means of a bell crank lever to said rod and adapted to be moved thereby to indicate the quantity of lubricant contained in said storage cylinder.

7. In a device of the class described, the combination of a body having a storage cylinder, means for establishing communication from a source of lubricant supply to said cylinder and subsequently cutting off said source of supply and opening the passage from said cylinder to a bearing to be lubricated, a piston reciprocable in said cylinder, a stem secured thereto, and extending outwardly from the end of said cylinder, a compression spring confined between said piston and said end of said cylinder, a bell crank pivotally mounted on the end of said piston rod, a semaphore rigidly secured to one arm of said bell crank, and a link pivotally carried by said body and having its end pivotally connected to the other arm of said bell crank.

8. A combined lubricant charge measuring and indicating device, including a body having a storage chamber and a valve cylinder, admission and discharge ports between said valve cylinder and said storage chamber, valve means in said cylinder to control the admission to and discharge of lubricant from said storage chamber, a plunger in said storage chamber, a bell crank lever attached to its outer end, a lug extending from said body, a pair of links pivoted thereon and attached to one leg of said bell crank lever and a semaphore attached to the other leg of said bell crank lever to manually discharge lubricant or to indicate the condition of the storage chamber.

9. In a series or progressive system of lubrication, a plurality of bearings, lubricant charge measuring devices each associated with one of said bearings and adapted to deliver a measured charge to its bearing and thereafter allow lubricant to pass through it to the next succeeding device, conduits connecting said devices in series, and a terminal lubricant charge measuring device connected to receive lubricant from the last device in the series, said terminal device having means for visually indicating the lubrication of the bearings of the entire system and for manually increasing the pressure on the lubricant discharged to the last bearing.

In witness whereof, I hereunto subscribe my name this 4th day of November, 1927.

ERNEST W. DAVIS.